United States Patent
Slutsman et al.

(10) Patent No.: US 7,957,427 B2
(45) Date of Patent: Jun. 7, 2011

(54) METHOD AND APPARATUS FOR ESTIMATING TRAFFIC FLOWS USING DYNAMIC LATENCY CONSTRAINTS

(75) Inventors: Lev Slutsman, Ocean, NJ (US); Norm Farber, Freehold, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 224 days.

(21) Appl. No.: 12/263,946

(22) Filed: Nov. 3, 2008

(65) Prior Publication Data

US 2010/0110909 A1    May 6, 2010

(51) Int. Cl.
*H04J 3/16*    (2006.01)
*H04J 3/06*    (2006.01)
*G01R 31/08*    (2006.01)

(52) U.S. Cl. .......................... 370/519; 370/468; 370/238

(58) Field of Classification Search ............... 370/236.1, 370/237, 238, 238.1, 400, 352, 390, 518, 370/519, 468, 465
See application file for complete search history.

(56) References Cited

U.S. PATENT DOCUMENTS

| | | | |
|---|---|---|---|
| 7,346,056 B2 * | 3/2008 | Devi | 370/392 |
| 2008/0155070 A1 * | 6/2008 | El-Damhougy et al. | 709/220 |
| 2009/0059793 A1 * | 3/2009 | Greenberg | 370/235 |
| 2009/0180480 A1 * | 7/2009 | Hilt et al. | 370/395.21 |

* cited by examiner

*Primary Examiner* — Hanh Nguyen

(57) ABSTRACT

A method and apparatus that use dynamic latency to estimate traffic flows in a communication network are disclosed. For example, the method obtains a demand matrix having at least one point pair demand, and satisfies each of the at least one point pair demand in the demand matrix by selecting a shortest path that minimizes a dynamic latency and a number of hops.

18 Claims, 3 Drawing Sheets

METHOD AND APPARATUS FOR ESTIMATING TRAFFIC FLOWS USING DYNAMIC LATENCY CONSTRAINTS

The present invention relates generally to communication networks and, more particularly, to a method and apparatus for estimating traffic flows using dynamic latency constraints in communication networks, e.g., packet networks such as Multi-Protocol Label Switch (MPLS), Internet Protocol (IP), Voice over Internet Protocol (VoIP), and Internet Protocol (IP) Multimedia Subsystem (IMS) networks.

BACKGROUND OF THE INVENTION

Traffic engineering is a key issue in designing and operating a network with traffic demand that changes over time due to network traffic growth or traffic pattern changes. One approach to address the above problems is to use the shortest path method, where the length of a link is its static latency as defined by the length of the underlying optical fiber route. However, this approach only takes into account of the static delay introduced by non-packet based network equipment, such as optical switches and cross-connect. Therefore, this approach cannot address the above problems with accuracy, especially in a packet based network environment where total latency varies with network loading, for latency sensitive network services such as VoIP services.

SUMMARY OF THE INVENTION

In one embodiment, the present invention discloses a method and apparatus that use dynamic latency to estimate traffic flows in a communication network. For example, the method obtains a demand matrix having at least one point pair demand, and satisfies each of the at least one point pair demand in the demand matrix by selecting a shortest path that minimizes a dynamic latency and a number of hops.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
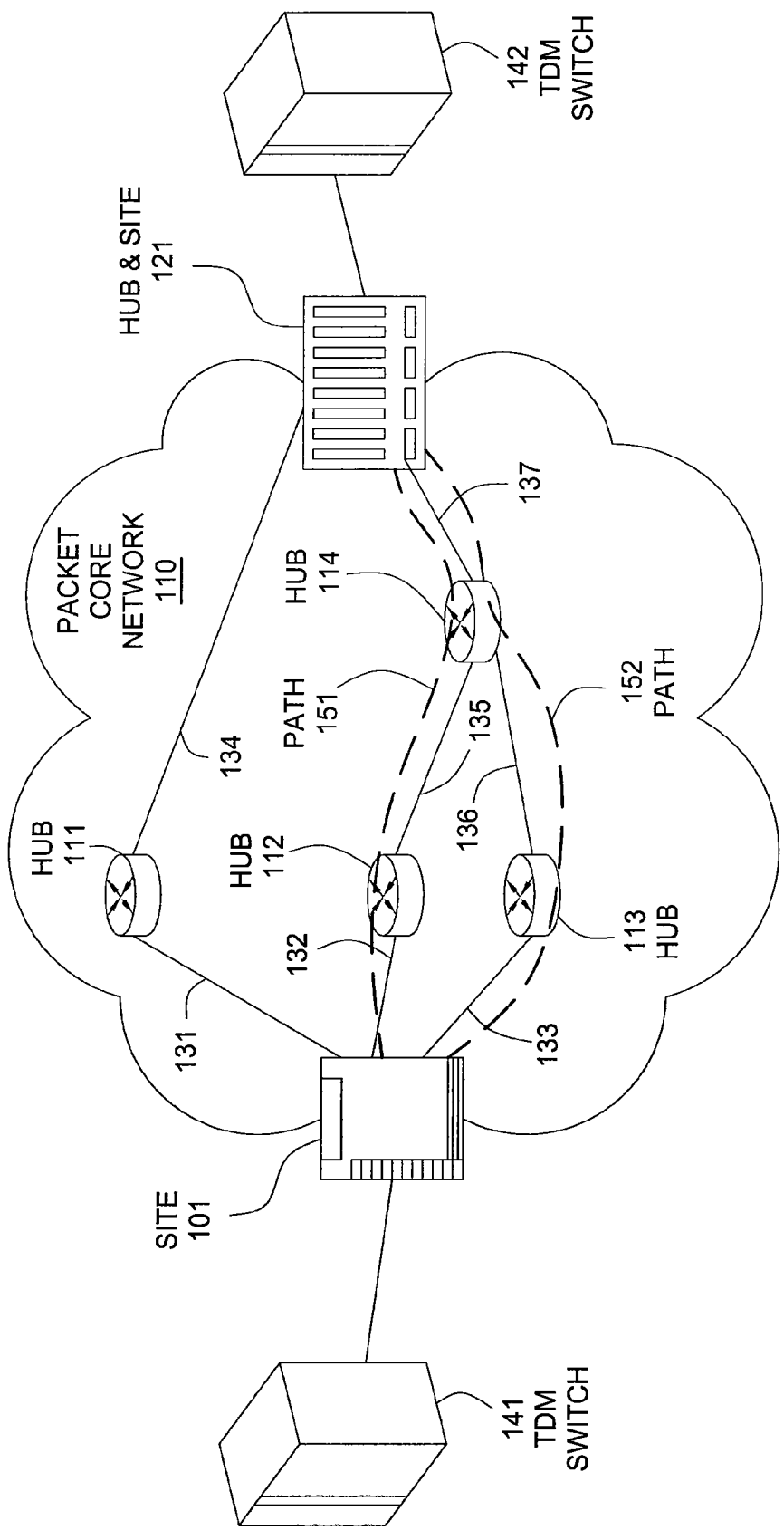
FIG. 1 illustrates an exemplary packet network related to the present invention.

Traffic engineering is a key issue in designing and operating a network with traffic demand that changes over time due to network traffic growth or traffic pattern changes. In a packet network environment, such as Multi-Protocol Label Switch (MPLS), Internet Protocol (IP), Voice over Internet Protocol (VoIP), and Internet Protocol (IP) Multimedia Subsystem (IMS) networks, network tools are needed to perform traffic engineering and network design to:

analyze and correct network growth forecasts;
provide information for augmentation of overloaded network links;
provide routing information for the network;
analyze link-loading and latency impacts of network link and router outages; and
calculate the spare capacity (growth) potential for the network One approach to address the above problems is to use the shortest path method, where the length of a link is its static latency as defined by the length of the underlying optical fiber route. However, this approach only takes into account of the static delay introduced by non-packet based network equipment, such as optical switches and cross-connect, and does not take into account of the variable queuing delay introduced by packet based network equipment, such as packet switches and routers, when the network load changes. Therefore, this approach cannot address the above problems with accuracy, especially in a packet based network environment where total latency varies with network loading, for latency sensitive network services such as VoIP services.

To address this criticality, the present invention uses dynamic latency instead of static latency to address network traffic engineering and design problems. In one embodiment, dynamic latency is defined to be the sum of the static delay caused by non-packet based network equipment and the queuing delay caused by packet based network equipment. When the load of a network link increases, the dynamic delay on that link also increases due to queuing delay introduced by packet based network equipment connecting the link. Extending the shortest path algorithm to account for dynamic latency, the present invention captures the variable delay effect in network links under different network loading, thereby providing optimized network traffic engineering and design by taking into account of additional capacity needed to accurately accommodate for latency sensitive requirements of certain packet based network services, such as VoIP services and the like.

In one embodiment, the present invention provides a network tool, e.g., known as a network loader. In this capacity, it starts with a demand matrix, Demand(Source, Destination, A), where Source and Destination are originating and terminating nodes, and A is the offered load between them. The present invention then determines network path(s) used to route the given demands. It addresses the following fundamental issues:

the network paths (a sequence of network links) to be used to load (support) a specific demand;
the network path priorities, e.g., primary network path and secondary network path, to support the traffic demand if more than one path is required;
the resultant path loads on the primary network path (A-Primary), and the secondary network path (A-Secondary).

While the demand matrix describes demands between two destinations, the physical connection carrying the demands between the two destinations can be achieved in many ways, provided the connection conforms to the existing underlying transport network topology and service performance requirements (e.g., latency). For example, in the VoIP network context, latency is a key parameter that affects voice quality. One function of the present invention is to determine the network paths for each demand in such a way that latency requirements for the network service are met.

The present invention also provides a method to gather and present informative reports. For example, there are a number of useful data views or reports that can be derived from the calculations of the present invention, such as individual link utilization, actual demands satisfied, and network links' dynamic latencies.

In one embodiment, the transport topology of a network comprises network nodes and links (e.g., optical fiber) connecting them. There are two input data structures that provide this connectivity information, the node list and the link list.

The node list provides a set of node names and their associated node types. In one embodiment, supported node types are site, hub, and hub & site, where:

A "site" is a source and/or sink of demands. In the VoIP context, a site is a location where VoIP service specific network devices interconnecting on the access side with TDM switches (e.g., the actual sources and sinks of voice traffic);

A "hub" is a router-only node, supporting pure IP routing and forwarding functions with no service VoIP service specific functions; and A "hub and site" is a location serving both the hub and the site functions.

A network transport link is defined in terms of its two end nodes: Node1 and Node2. The link list data structure consists of:

Names of each of the link's two end nodes;

Static latency computed as the propagation delay (in optical fiber) between end-nodes;

Link Capacity;

Imbedded Load (due to other traffic flows, e.g., non-voice data traffic if the investigation is for a voice study). The actual link capacity available to the application being studied is then the link capacity minus the imbedded load.

FIG. 1 illustrates an exemplary packet network related to the present invention. Network 100 comprises a packet core network 110, a site node 101, a hub & site node 121, hub nodes 111 to 114, links 131 to 137, and TDM switches 141 to 142. Note that site node 101 and hub & site node 121 are connected to TDM switch 141 and TDM switch 142, respectively.

Table 1 illustrates an example network node list of the present invention. For example, column 1 provides the node names and column 2 provides the node types associated with the corresponding node names.

TABLE 1

| Node Name | Node Type |
|---|---|
| RochPark | Site |
| Indy | Site |
| Columbia | Hub & Site |
| Bothell | Hub |
| Denver | Hub |

Table 2 illustrates an example network link list of the present invention. For example, column 1 provides the name of one node, e.g., Node1, connected by the associated network link. Column 2 provides the name of the other node, e.g., Node2, connected by the associated network link. Column 3 provides the static latency between Node1 and Node2 in milliseconds. Column 4 provides the total capacity of the network link. Note that OC12 represents 622 Mbps, OC24 represents 1.2 Gbps, and OC48 represents 2.4 Gbps in bandwidth. Column 5 provides the imbedded capacity currently under used by other applications or services in a network link.

TABLE 2

| Node 1 | Node 2 | Latency | Capacity | CurrentLoad |
|---|---|---|---|---|
| Bothell | Denver | 10.53 | OC24 | 0 |
| Columbia | RochPark | 1.66 | OC48 | 0 |
| Columbia | Indy | 4.75 | OC12 | 0 |
| Denver | Indy | 8.62 | OC48 | 0 |

The demand matrix, Demand(Source, Destination, A) or the Demand file provides:

Source node (the source node must be a site or a hub&site)

Destination node (the destination node must be a site or hub&site)

Value of demand (expressed in Erlangs or minute of use (MOU)).

The Erlang is a dimensionless unit used in telephony as a statistical measure of the volume, such as the percentage of utilization, of telecommunications traffic.

A subset of an example demand file, or demand matrix, is shown in Table 3. Table 3 illustrates an example demand matrix of the present invention. Column 1 and column 2 provide the point pair demand between the two nodes shown in column 1 and column 2. Column 3 provides the traffic demand between the corresponding point pair.

TABLE 3

| Anaheim | Anaheim | 0 |
|---|---|---|
| Anaheim | Boston | 41 |
| Anaheim | Chicago | 148 |

Two observations need to be noted here. The demands are satisfied in the order they are shown in the demand file. For instance, the (Anaheim-Boston) point pair demand would be satisfied prior to the (Anaheim-Chicago) point pair demand shown in Table 3. Furthermore, it is possible to split a demand between a source and destination pair into two or more sub-demands with different priorities, which is important to support minimum cost routing.

In one embodiment, the demands are satisfied in the order presented in the demand matrix that is integral to the long distance VoIP application, where the point-to-point demands have different savings implications. The ordering used for that application is the rank order of savings so that, if there are capacity limitations, the best-savings demand parcels will be satisfied first.

The links data structure defines the static link latency (which is, in effect, the link's actual propagation delay under zero load). Now, the novel approach of dynamic latency is detailed. In one embodiment, the dynamic latency, Dlatency, is defined as:

Dlatency=Slatency+Qdelay where, Slatency, is the static latency as shown in the network link list file, and Queuing delay is defined by the M/M/1 model, that is:

Qdelay=$r/(1-r)$ where r is a link utilization with the value range of (0 to 1).

Closely related to the link dynamic latency is the notion of the path dynamic latency. Referring to FIG. 1, network path 151 is made up of network link 132, link 135, and link 137, for instance. Since a path is a sequence of links, the corresponding delay is just a sum of the dynamic delays for all the links in the path. This is important since the present invention considers a path usable if and only if its dynamic latency does not exceed a maximum delay, MaxDelay, with a default value of 50 ms, which is a configurable parameter set by the user.

It should be realized that a link may participate in many paths to satisfy multiple demands. Therefore the dynamic latency for a given path, P, must be recomputed every time when one or more links of the path, P, are used to satisfy a new demand. For example, assume that demand A was loaded on path 151 shown in FIG. 1, and that demand B has a lower priority than A, and path 152 is planned to be used to support demand B. Note that both path 151 and path 152 use link 137 as shown in FIG. 1. Then, the dynamic latency of path 151 should be recomputed to reflect the additional load on the common link 137 after demand A has been satisfied. If the recomputed dynamic latency exceeds the MaxDelay value, then path 152 is no longer usable to meet demand B.

In one embodiment, the algorithm of the present invention uses two objectives:

The primary objective is to use the shortest path (path with minimum dynamic latency) to maintain the desired quality-of-service for all traffic demands; and The secondary objective is maximize network throughput by using minimum hop paths. Note that considering that the savings for the VoIP application is dependent on destination only, there is an economic incentive to use a path with fewer hops to reach a given destination.

Figure 2:
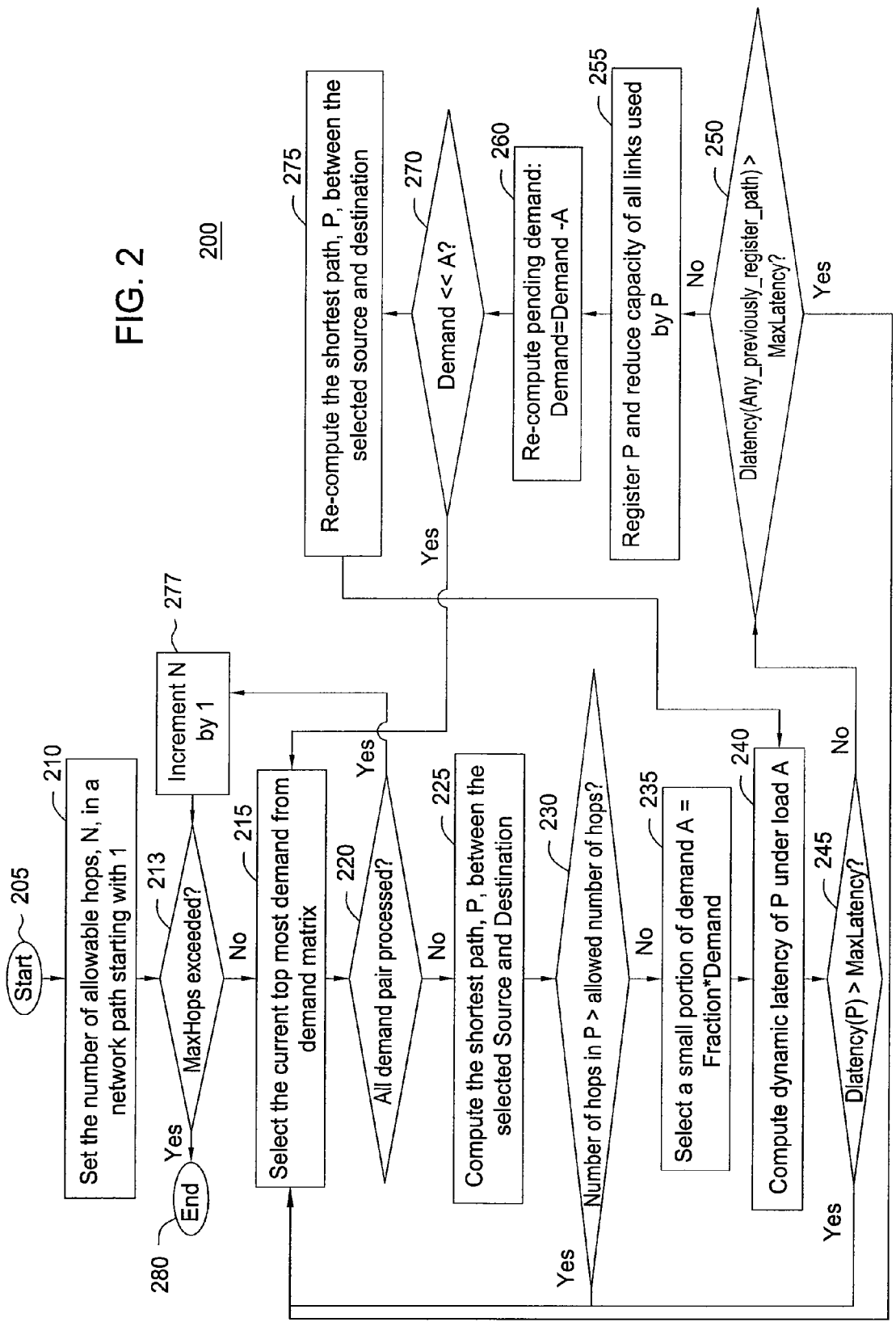
FIG. 2 illustrates a flowchart of a simplified method of the present invention.

FIG. 2 illustrates a flowchart of a method 200 of the present invention. The simplified description of algorithm is first given to make it easier to follow the formal description given later. Method 200 starts in step 205 and proceeds to step 210.

In step 210, the method sets the number of allowable hops, N, in a path starting with a minimum hop count value (e.g., a value of 1). The method passes through the demand matrix up to MaxHops (a maximum hop count value) number of times, where MaxHops is a user configurable parameter.

In step 213, the method checks if the method has already passed through the demand matrix MaxHops number of times. If method has already passed through the demand matrix MaxHops number of times, the method proceeds to step 280; otherwise, the method proceeds to step 215.

In step 215, the method selects the current topmost demand, $D_i$(Source, Destination, Demand), from the demand matrix. When step 215 is reached from step 213, the very first entry of the demand matrix is selected. When step 215 is reached from step 230, step 245, step 250 or step 270, the next entry in the demand matrix is selected.

In step 220, the method checks if all the demand pair, $D_i$ for all i, in the demand matrix has been processed. If all the demand, $D_i$ for all i, has been processed, the method proceeds to step 277; otherwise, the method proceeds to 225.

In step 225, the method computes the shortest path, P, between Source and Destination specified in the current demand being processed.

In step 230, the method checks if the number of hops in path, P, is greater than the allowed number of hops fixed in step 210. If the number of hops in path, P, is greater than the allowed number of hops, the method proceeds to step 215 to select the next topmost demand; otherwise, the method proceeds to step 235.

In step 235, the method selects a small portion of demand A=Fraction*Demand, where Fraction is a user configurable parameter and Demand is the Demand value associated with the Source and Destination pair selected in step 215. In one embodiment of the present invention, the Fraction value is set to 0.001.

In step 240, the method computes the dynamic latency, Dlatency, of P under load A. Note that there is no updating of the link latency information at this point.

In step 245, the method checks if Dlatency of path P is greater than MaxLatency. Note that MaxLatency is a user configurable parameter. If Dlatency of path P is greater than MaxLatency, the method proceeds to step 215 to select the next topmost demand; otherwise, the method proceeds to step 250.

In step 250, the method checks if Dlatency of any previously register path is greater than MaxLatency. If Dlatency of any previously register path is greater than MaxLatency, the method proceeds to step 215 to select the next topmost demand; otherwise, the method proceeds to step 255.

In step 255, the method registers path P and reduces the capacity of all links in the P to account for additional load of A. In other words, the available capacity in all links in the path P is decreased by the amount of load A or the used capacity in all links in the path P is increased by the amount of load A.

In step 260, the method re-computes the pending demand, Demand=Demand−A. The pending demand is the remaining demand that still needs to be met. The demand matrix is updated to reflect the demand after load A has been satisfied.

In step 270, the method checks if the pending demand is very small. If the pending demand is very small, the method proceeds to step 215 to select the next topmost demand; otherwise, the method proceeds to step 275.

In step 275, the method re-computes the shortest path, P, between Source and Destination selected in step 215. Note that the newly computed path P may be different from the path P before the re-computation. The method then proceeds to step 240.

In step 277, the method increments N by 1 and proceeds to step 213. The method ends in step 280.

It should be noted that although not specifically specified, one or more steps of method 200 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 2 that recite a determining operation or involve a decision, do not necessarily require that both branches of the determining operation be practiced. In other words, one of the branches of the determining operation can be deemed as an optional step.

The formal description in the form of pseudo code of the present invention is now presented below.

```
1.  FOR NumHops=1 TO MaxHops
        IF TotalRemainingDemand ( ) <=0 Then Exit Loop
    /*
    The algorithm makes upto MaxHops passes through the demand file (demands are
    sorted in the order of their priorities). On each path, only shortest paths with number
    of hops<= NumHops may be used to load demands. TotallRemainingDemand ( ) is
    a function that returns the total pending demand.
    */
```

```
2.  For I=1 TO #Demands
        Src=Demand(I).Source            'Demand Originating Node
        Dst=Demand(I).Destination       'Demand Terminating Node
        A=Demand(I).RemainingDemand     'Remaining demand (erlang)
        H=Fraction(A)                      'Take a "small fraction of load A"
3.      While A>0                       'This loop will handle H erlangs at the time
            S= GenerateShortPaths(Src, Dst)
/*Generalized Dijkstra Algorithm is used to produced the collection S of shortest
paths between Src and Dst.
The paths in the collection are sorted by number of hops.
*/
            Start:
            If S is empty THEN goto NextDemand
                              'Check if there is at least one path in the collection
            P=S.Item(1)
                        'Select the path P - top item (min hops) from the collection
            Nhops=Hops(P)              'Compute number of hops for P
            If Nhops>NumHops THEN goto NextDemand
                     'Only paths with hops <= NumHops may be used
                     ' Check the feasibility of paths:
4.          If LinkOverload(P,H) THEN
/* Check if any link along P is overloaded (dynamic latency> MaxLatency when H
is loaded)
*/
                ResisterRejectePath(P,Reason="Latency")
                                          ' Keep track of rejected paths
                S.remove(1)
                                          'Remove overloaded path from the collection S
                Goto Start
                ' In fact, LinkOverload check is optional with current implementation
            End if
            If PathLatency(P,H)>MaxLatency THEN
                                          'Check path P latency when H erlang is picked up
                ResisterRejectePath(P,Reason="Latency")
                                          ' Keep track of rejected paths
                S.remove(1)
                                          'Remove overloaded path from the collection S
                Goto Start
            End if
            If Not ChkRegPath(P,H) THEN
/* Check if any of previously checked paths which share links with P are affected
but loading P
*/
                ResisterRejectePath(P,Reason="Latencyon the Path XYZ is effected")
                                          ' Keep track of rejected paths
                S.remove(1)
                                          'Remove overloaded path from the collection S
                Goto Start
            End if
            LoadLinks(P, H)
                                          ' reduce the capacity of all links invoked by H
            Demand(I).LoadedDemand= Demand(I).LoadedDemand+H
                                          ' Updata Loaded Demand
            Demand(I).RemainingDemand = Demand(I).RemainingDemand−H
                                          'Decrease Remaining Demand
            RegisterPath(P,H)             'Register Path P
        End While                         ' Load next H portion of load
        NextDemand:
        Next I                            'Next demand from the list
    Next NumHops                          'Increase the number of hops per path
```

Figure 3:
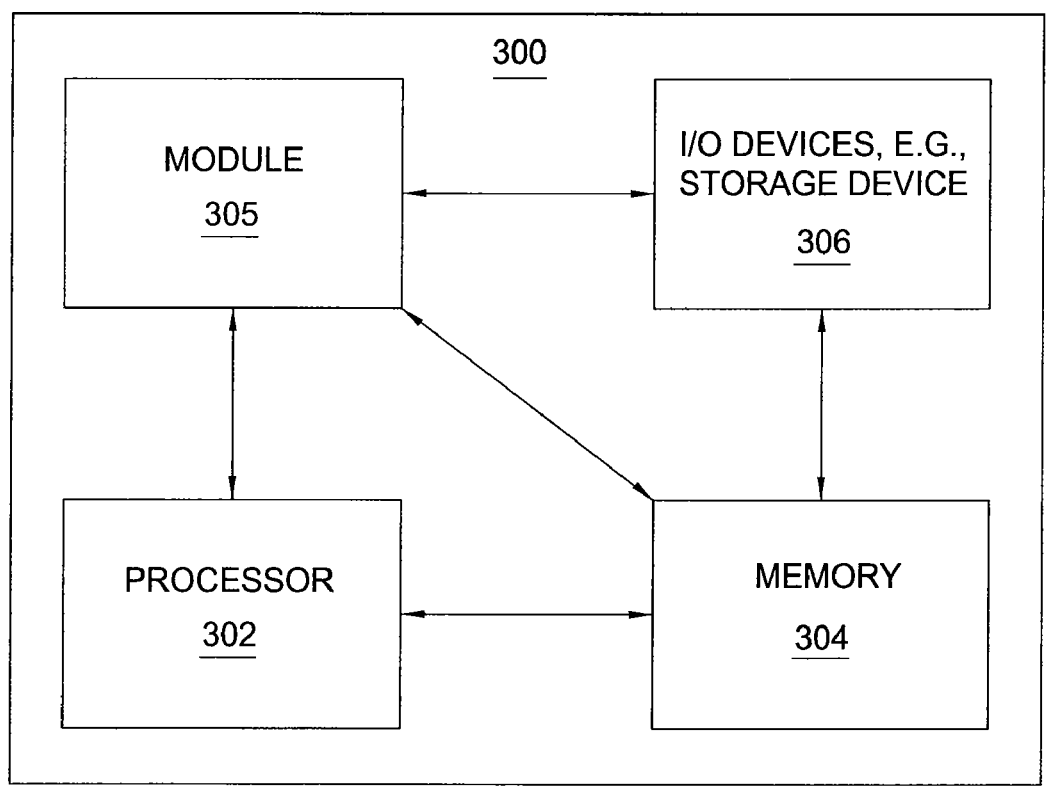
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for estimating traffic flows using dynamic latency constraints, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for estimating traffic flows using dynamic latency constraints can be loaded into memory 304 and executed by processor 302 to implement the functions as discussed above. As such, the present process 305 for estimating traffic flows using dynamic latency constrains (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for estimating traffic flows in a communication network, comprising:
   obtaining a demand matrix having a plurality of point pair demands; and
   satisfying, via a processor, each of the plurality of point pair demands in the demand matrix by selecting a shortest path that minimizes a dynamic latency and a number of hops, wherein the dynamic latency is a sum of a static latency and a queuing delay.

2. The method of claim 1, wherein the communication network comprises a a packet network.

3. The method of claim 1, wherein each of the plurality of point pair demands is satisfied in a list order in the demand matrix.

4. The method of claim 3, wherein each of the plurality of point pair demands is subdivided into a plurality of sub-demands.

5. The method of claim 1, wherein the satisfying comprises:
   computing the shortest path for a first one of the plurality of point pair demands in accordance with a hop count value starting from a minimum hop count value to a maximum hop count value;
   using the computed shortest path to satisfy a small fraction of the first one of the plurality of point pair demands if a hop count and a dynamic latency of the computed shortest path meets both the maximum hop count value and a maximum dynamic latency; and
   updating a current load entry for all links used by the shortest path and the demand matrix to take into account of the small fraction of demand that has been satisfied.

6. The method of claim 5, wherein the small fraction, the maximum hop count value, and the maximum dynamic latency are user configurable parameters.

7. The method of claim 5, further comprises:
   satisfying a remaining portion of the first one of the plurality of point pair demands after the small fraction has been satisfied until an entire demand of the first one of the plurality of point pair demands has been satisfied; and
   satisfying a next one of one the plurality of point pair demands in the demand matrix if the entire demand of the first one of the plurality of point pair demands has been satisfied.

8. The method of claim 1, wherein the queuing delay is computed by using $r/(1-r)$ where r is a link utilization.

9. A computer-readable medium having stored thereon a plurality of instructions, the plurality of instructions including instructions which, when executed by a processor, cause the processor to perform steps of method for estimating traffic flows in a communication network, comprising:
   obtaining a demand matrix having a plurality of point pair demands; and
   satisfying, via a processor, each of the plurality of point pair demands in the demand matrix by selecting a shortest path that minimizes a dynamic latency and a number of hops, wherein the dynamic latency is a sum of a static latency and a queuing delay.

10. The computer-readable medium of claim 9, wherein the communication network comprises a a packet network.

11. The computer-readable medium of claim 9, wherein each of the plurality of point pair demands is satisfied in a list order in the demand matrix.

12. The computer-readable medium of claim 11, wherein each of one the plurality of point pair demands is subdivided into a plurality of sub-demands.

13. The computer-readable medium of claim 9, wherein the satisfying comprises:
   computing the shortest path for a first one of the plurality of point pair demands in accordance with a hop count value starting from a minimum hop count value to a maximum hop count value;
   using the computed shortest path to satisfy a small fraction of the first one of the plurality of point pair demands if a hop count and a dynamic latency of the computed shortest path meets both the maximum hop count value and a maximum dynamic latency; and
   updating a current load entry for all links used by the shortest path and the demand matrix to take into account of the small fraction of demand that has been satisfied.

14. The computer-readable medium of claim 13, wherein the small fraction, the maximum hop count value, and the maximum dynamic latency are user configurable parameters.

15. The computer-readable medium of claim 13, further comprises:
   satisfying a remaining portion of the first one of the plurality of point pair demands after the small fraction has been satisfied until an entire demand of the first one of the plurality of point pair demands has been satisfied; and
   satisfying a next one of the plurality of point pair demands in the demand matrix if the entire demand of the first one of the plurality of point pair demands has been satisfied.

16. The computer-readable medium of claim 9, wherein the queuing delay is computed by using $r/(1-r)$ where r is a link utilization.

17. An apparatus for estimating traffic flows in a communication network, comprising:
   means for obtaining a demand matrix having a plurality of point pair demands; and
   means for satisfying, via a processor, each of the plurality of point pair demands in the demand matrix by selecting a shortest path that minimizes a dynamic latency and a number of hops, wherein the dynamic latency is a sum of a static latency and a queuing delay.

18. The apparatus of claim 17, wherein the satisfying means comprises:
   means for computing the shortest path for a first one of the plurality of point pair demands in accordance with a hop count value starting from a minimum hop count value to a maximum hop count value;
   means for using the computed shortest path to satisfy a small fraction of the first one of the plurality of point pair demands if a hop count and a dynamic latency of the computed shortest path meets both the maximum hop count value and a maximum dynamic latency; and
   means for updating a current load entry for all links used by the shortest path and the demand matrix to take into account of the small fraction of demand that has been satisfied.

* * * * *